United States Patent Office 3,201,443
Patented Aug. 17, 1965

3,201,443
MONO AND POLY(O,O-DIALKYL PHOSPHATO) AND (O,O-DIALKYL PHOSPHONATO) AZO-METHINE ESTERS
Hugo Malz, Leverkusen, Hans Holtschmidt and Engelbert Kühle, Cologne-Stammheim, and Otto Bayer, Leverkusen-Bayerwerk, Germany, assignors to Farbenfabriken Bayer Aktiengesellschaft, Leverkusen, Germany, a German corporation
No Drawing. Filed Jan. 10, 1963, Ser. No. 250,492
Claims priority, application Germany, Jan. 26, 1962, F 35,857
11 Claims. (Cl. 260—461)

It is known that isocyanide dihalides or derivatives of this compound class, which are formed by substitution of one halogen atom by amino, ether or thioether radicals, react with esters of phosphorous acid or with thiol group-containing phosphorus compounds under formation of compounds of the general Formula I:

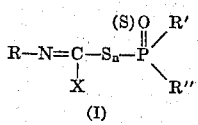

(I)

wherein R stands for aliphatic or optionally substituted aromatic hydrocarbon radicals, R′ and R″ stand for identical or different hydrocarbon radicals or alkoxy or phenoxy radicals, $n$ stands for 1 or 0, and X for a further radical

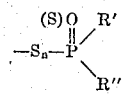

or for amino, ether or thioether radicals. The symbol (S)O in the structural formula may also be represented as D wherein D is a chalcogen having an atomic number less than 17.

The object of the present invention is to provide a process for the production of new phosphorus-containing compounds which are obtained by allowing halogen-substituted alkylisocyanide dichlorides to react with thiol group-containing phosphorus compounds or with phosphorous acid esters.

The halogen-substituted alkylisocyanide dichlorides to be used according to the invention, of the following general formula

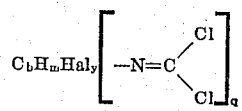

wherein, when $q$ is 1, $b$ is a whole number $\geq 1$,
$m$ is a whole number or 0,
$y$ is a whole number of at least 1 and $m+y$ being $2b+1$, and when $q$ is 2, $b$ is a whole number $\geq 2$,
$m$ is a whole number $\geq 0$,
$y$ is a whole number of at least 1 and $m+y$ being $2b$, are easily accessible by the methods (I) and (II) set forth in detail hereinafter.

The halogen atoms at the C atom of the alkyl radical close to the isocyanide group are distinguished by a particular reactivity and react in the present case readily with phosphorous acid esters in the manner of an Arbuzov reaction and with thiol phosphates or salts thereof under formation of corresponding thioesters. With an excess or stoichiometric quantities of thiol phosphates or phosphorous acid esters, it is therefore possible to substitute, in addition to the halogen atoms of the isocyanide group, also those of the C atom α-positioned to this isocyanide group, by thiol phosphate or phosphonate radicals, whereby compounds of the general Formula III are obtained

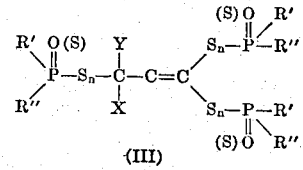

(III)

wherein $X = -S_n - P \begin{smallmatrix}(S)O\\ \parallel\\ \phantom{P}\end{smallmatrix} \begin{smallmatrix}R'\\ \\ R''\end{smallmatrix}$, denote a hydrogen atom or optionally halogen-substituted aliphatic hydrocarbon radicals, and $Y = -S_n - P \begin{smallmatrix}(S)O\\ \parallel\\ \phantom{P}\end{smallmatrix} \begin{smallmatrix}R'\\ \\ R''\end{smallmatrix}$ or a hydrogen atom, R′ and R″=alkoxy radicals, and
$n=0$ or 1.

In the reaction with thiol phosphate, the halogen atoms at the C atom close to the isocyanide group are more readily reactive in some cases than the halogen atoms at the isocyanide group itself. This becomes especially apparent when haloalkyl isocyanide dihalides are employed which contain one or more isocyanide dihalide groups in the molecule. By using corresponding stoichiometric quantities of the reaction components, it is thus possible to prepare phosphorus compounds with intact isocyanide dihalide groups, for example of the general Formula IV:

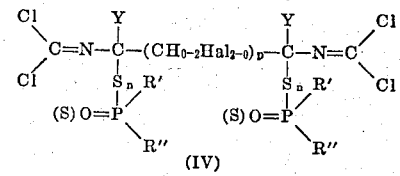

(IV)

wherein Y is a hydrogen atom or

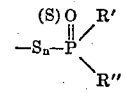

and $p$ is a whole number $\geq 0$.

By using an excess of thiol phosphates or phosphorus acid esters, it is, of course, possible to react the halogen atoms of the isocyanide groups in Formula IV so that compounds of the general Formula V

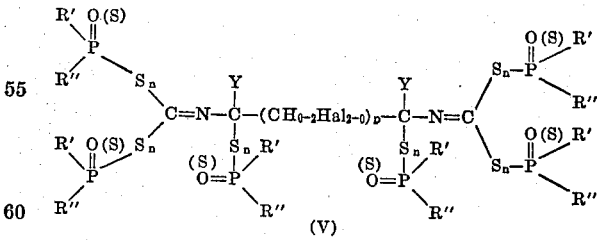

(V)

are formed.

For the production of the new phosphorus compounds, halogenalkyl isocyanide dichlorides are reacted with stoichiometric quantities or an excess of phosphorous acid esters, of thiol group-containing compounds of phosphorus, or of alkali metal or ammonium salts thereof. The concurrent use of inert solvents or diluting agents is recommended. The reaction is in many cases exothermic in other cases it is necessary to heat the reaction mixture for some time to elevated temperatures (in general to about 70–150° C.), in order to complete the reaction.

The new compounds are, in general, obtained in the form of light-yellow to brown oils the majority of which cannot be distilled without decomposition. They are distinguished by a high insecticidal action which in some cases considerably exceeds that of the known compounds of Formula I described at the outset.

The compounds of the invention are not only active against insects, such as flies, beetles, aphids and mosquitos but also against spider mites, nematodes and fungi.

The compounds of the invention which are especially active against pests can be represented by the following formula:

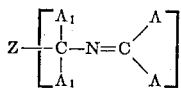

in which each A stands for a member selected from the group consisting of chlorine and the

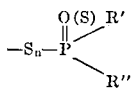

radical, wherein n is selected from 0 and 1, R' and R" stand for alkoxy radicals containing 1–4 carbon atoms; each $A_1$ stands for a member selected from the group consisting of chlorine, hydrogen and the

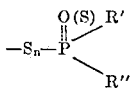

radical; Z stands for a member selected from the group consisting of the

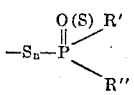

radical and the

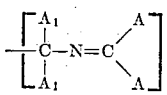

radical, and chloroalkyl radicals containing from 1–4 carbon atoms.

The chloro-substituted methyl isocyanide dichlorides which are used as starting materials in the process of the invention can be produced according to process (I) wherein carbamic acid halides of the general formula

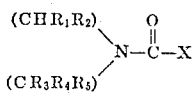

in which $R_1$, $R_2$, $R_3$, $R_4$ and $R_5$ represent chlorine or hydrogen, and X represents bromine or chlorine, are treated at temperatures above 160° C. with chlorine and the chloro-substituted methyl isocyanide dichlorides are isolated.

The alkyl-isocyanide-dichlorides used as starting materials for the process of the invention can be produced according to the process (II) which comprises first of all reacting a compound of the formula

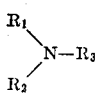

in which $R_1$ and $R_2$ separately stand for alkyl or aryl groups or their halogen, cyano, aryl, alkyl, amino or imino derivatives, and in which $R_1$ and $R_2$ together with =N— jointly stand for an isocyclic or heterocyclic ring, and in which $R_3$ stands for methyl or aryl groups or their substitution products; with chlorine at temperatures below 140° C. to the extent that all replaceable hydrogen atoms are replaced by chloro-atoms, and then treating the chlorination product thus obtained with chlorine at temperatures between 140° and 300° C., whereby alkyl chloride is split off, and finally recovering the organic nitrogen compound containing said imide-chloride grouping from the reaction mixture.

The following examples are given for the purpose of illustrating the invention.

*Example 1*

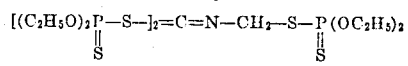

To a solution of 61 g. of the ammonium salt of O,O-diethylthiolthiono phosphoric acid in 200 ml. of acetone, there is added dropwise with stirring a solution of 14.7 g. of chloromethyl isocyanide dichloride in 50 ml. of acetone. The reaction mixture is subsequently heated to the boil for about ½ hour, then cooled to room temperature, and the precipitated ammonium chloride filtered off with suction. The filtrate is evaporated under vacuum, the oily residue of the distillation taken up in ether and washed with water to neutral reaction. After evaporation of the solvent, 60 g. of a viscous orange-red oil are obtained.

Calculated for $C_{14}H_{32}O_6NP_3S_6$: C, 28.2%; H, 5.4%; N, 2.4%; P, 15.6%; S, 32.3%. Found: C, 28.7%; H, 5.5%; N, 2.9%; P, 15.4%; S, 31.8%.

If instead of the ammonium salt of O,O-diethylthiolthiono phosphoric acid, there is reacted in the same manner an equimolar quantity of the ammonium salt of O,O-diethylthiol phosphoric acid, the compound

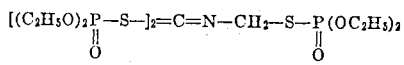

is obtained in the form of a red-brown oil.

0.1% solutions considerably impair the growth of broad leaved plants, whilst grass is in general, not damaged.

0.01% solutions are 100% effective against cockroaches, predacious bugs, corn beetles, flies, spider mites. The compound has, moreover, a systemic and ovicidal action. $DL_{50}$ is about 5 mg./kg. of mouse.

*Example 2*

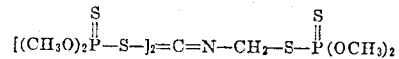

As described in Example 1, a solution of 26.5 g. of the ammonium salt of O,O-dimethylthiolthiono phosphoric acid in 250 ml. of acetone is reacted with a solution of 7.4 g. of chloromethyl isocyanide dichloride in 50 ml. of ether. After separating the precipitated ammonium chloride, the solution is poured into about 250 ml. of water and the separated oil is washed to neutral reaction. About 17 g. of a ruby-coloured oil are thus obtained which cannot be distilled without decomposition.

Calculated for $C_8H_{20}O_6NP_3S_6$: C, 18.8%; H, 3.9%; N, 2.7%; S, 37.6%; P, 18.2%. Found: C, 19.3%; H, 4.3%; N, 3.5%; S, 38.5%; P, 17.8%.

0.1% solutions are 100% effective against flies and spider mites.

*Example 3*

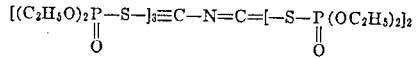

A solution of 10.7 g. of trichloromethyl isocyanide dichloride in 100 ml. of acetone is added dropwise with stirring to a solution of 94 g. of the ammonium salt of O,O-diethylthiol phosphoric acid in 300 ml. of acetone. In an exothermic reaction, the solution turns orange-red, ammonium chloride being precipitated. The mixture is subsequently heated to the boil for about ½ hour, whereupon the ammonium chloride is filtered off with suction at room temperature. The filtrate is evaporated under vacuum, the residue of the distillation taken up in ether and washed with water to neutral reaction. After drying over sodium sulphate, the solvent is evaporated, whereby 43 g. of a red-brown oil are obtained.

Calculated for $C_{22}H_{50}O_{15}NP_5S_5$: C, 30.4%; H, 5.8%; N, 1.6%; P, 17.9%; S, 18.4%. Found: C, 30.4%; H, 5.7%; N, 1.6%; P, 18.2%; S, 17.8%.

0.004% solutions are 100% effective against caterpillars, flies, aphides and spider mites.

By reacting the potassium salt of O,O-diethylthiothiono phosphoric acid with trichloromethyl isocyanide dichloride in methyl ethyl ketone as solvent, in the manner described above, the compound

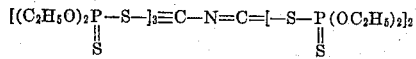

is obtained in the form of a red-brown clear oil.

Calculated for $C_{22}H_{50}O_{10}NP_5S_{10}$: C, 27.4%; H, 5.2%; N, 1.5%; P, 16.1%; S, 33.2%. Found: C, 27.8%; H, 5.9%; N, 2.0%; P, 15.8%; S, 31.9%.

0.004% solutions are 100% effective against flies, 0.1% solutions 100% against aphides, caterpillars, spider mites. $DL_{50}$ is about 250 mg./kg. of mouse.

*Example 4*

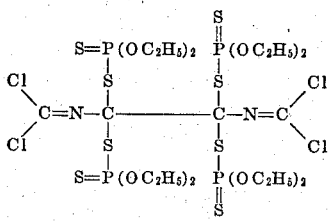

To a suspension of 18 g. of tetrachloroethyl-1,2-bis-isocyanide dichloride in about 100 ml. of acetone, there is added dropwise with stirring a solution of 40.6 g. of the ammonium salt of O,O-diethylthiothiono phosphoric acid in 180 ml. of acetone. In a strongly exothermic reaction, the solution turns yellow, whilst ammonium chloride is precipitated. The temperature of the reaction mixture is maintained at below about 35° C. by occasional cooling with cold water. Stirring is continued for about 15 minutes and the precipitated ammonium chloride is then filtered off with suction. The filtrate is subsequently evaporated under vacuum and the residual brown oil taken up in ether. The solution is washed with water, dried over sodium sulphate and the solvent subsequently evaporated. 40 g. of a red-brown oil are thus obtained.

Calculated for $C_{20}H_{40}O_8N_2P_4S_8Cl_4$: C, 25.0%; H, 4.7%; N, 2.9%; P, 13.0%; S, 26.7%; Cl, 14.8%. Found: C, 25.6%; H, 4.6%; N, 3.0%; P, 13.3%; S, 27.1%; Cl, 14.1%.

If the ammonium salt of O,O-dimethylthiothiono phosphoric acid is used in the same manner, the corresponding methyl ester

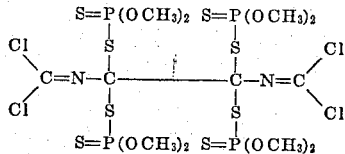

is obtained in the form of a red-brown clear oil.

250 mg./kg. of mouse are tolerated without symptoms.

*Example 5*

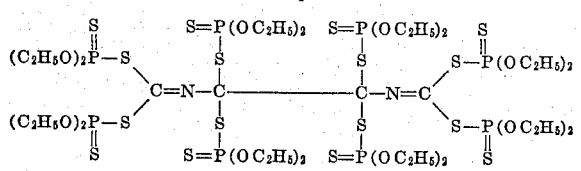

To a suspension of 18 g. of tetrachloroethyl-1,2-bis-isocyanide dichloride in 100 ml. of acetone, there is added dropwise with stirring a solution of 81.2 g. of the ammonium salt of O,O-diethylthiothiono phosphoric acid in 250 ml. of acetone and the temperature of the reaction mixture is maintained at below about 35° C. by occasional cooling with water. The reaction mixture is subsequently heated to the boil for about one-half hour and the precipitated ammonium chloride filtered off with suction at room temperature. The filtrate is evaporated under vacuum, the residue taken up in ether and washed three times with water. The solution is dried over sodium sulphate and evaporated, whereby a red-brown oil (54 g.) is obtained which, after standing for several days, is filtered off with suction through a $G_3$-frit until clear.

Calculated for $C_{36}H_{80}P_8O_{16}N_2S_{16}$: C, 27.8%; H, 5.1%; N, 1.8%; S, 32.9%; P, 15.9%. Found: C, 28.3%; H, 5.4%; N, 2.0%; S, 32.8%; P, 15.4%.

*Example 6*

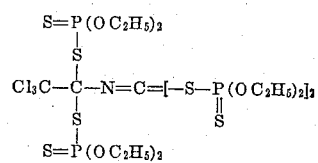

To a solution of 14.9 g. of pentachloroethyl isocyanide dichloride in 100 ml. of acetone, there are added dropwise with stirring 41.9 g. of the ammonium salt of O,O-diethylthiothiono phosphoric acid dissolved in 200 ml. of acetone. The solution turns yellow, while the temperature of the mixture rises to about 32° C. and ammonium chloride is precipitated. The mixture is subsequently heated to the boil for about one-half hour and the precipitated ammonium chloride filtered off with suction at room temperature. After evaporation of the filtrate, a dark-brown oil remains which is taken up in ether and washed with water. After evaporation of the solvent, 47 g. of a dark-brown oil are obtained.

Calculated for $C_{19}H_{40}O_8NP_4S_8Cl_3$: N, 1.6%; P, 13.8%; S, 28.6%; Cl, 11.9%. Found: N, 2.0%; P, 13.6%; S, 29.2%; Cl, 11.5%.

$DL_{50}$: 1000 mg./kg. mouse, by subcutaneous application.

When using the corresponding dimethyl ester of dithio-phosphoric acid, the compound

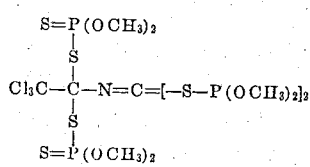

is obtained in the form of a brown oil.

Calculated for $C_{11}H_{24}O_8NP_4S_8Cl_3$: N, 1.8%; P, 15.8%; S, 32.7%; Cl, 13.6%. Found: N, 2.1%; P, 15.4%; S, 33.2%; Cl, 12.9%.

In a corresponding manner, the compound

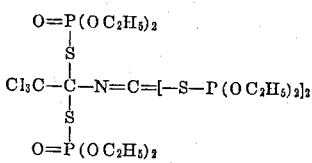

can be obtained from the diethyl ester of thiol phosphoric acid in the form of a brown oil.

0.01% solutions are 100% effective against corn beetles, predacious bugs, caterpillars and flies. Moreover, the compound has an ovicidal and systemic action.

*Example 7*

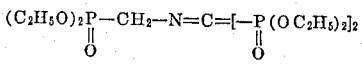

14.6 g. of chloromethyl isocyanide dichloride are added dropwise with stirring to 49.8 g. of triethyl phosphite. After several minutes, the temperature of the reaction mixture suddenly rises strongly (up to 80–90° C.), whereby a light-brown clear oil is formed. Stirring is continued for about 1 hour and in order to remove volatile constituents, a water-pump vacuum is first applied and then an oil pump vacuum, at about 40–50° C., and a clear yellow-brown oil is thus obtained.

If instead of triethyl phosphite, equimolar quantities of tri-n-butyl phosphite are used, the compound

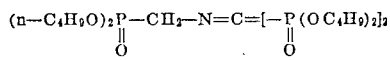

is obtained in the same manner in the form of a light-brown viscous oil.

Example 8

1000 parts by weight of bis-chloromethyl carbamic acid chloride are heated to 185° C. in a reaction vessel with addition of chlorine. The reaction vessel is provided with a column. Phosgene is split off and the chloromethyl isocyanid dichloride distills off a large quantity. The column is so controlled that the chloromethyl carbamic acid chloride can distil off quickly and continuously. The crude distillate which is obtained is then again subjected to a fractional distillation in vacuum. Chloromethyl isocyanide dichloride is obtained with a boiling point of 36 to 37° C./12 mm. Hg, $n_D^{20}$ 1.4984.

The bis-chloromethyl carbamic acid chloride which is used as starting material can be prepared by initially introducing a strong stream of chlorine at room temperature into, for example, 1000 parts by weight of dimethyl carbamic acid chloride, while irradiating with ultra-violet light. The temperature then rises to 120° C. The stream of chlorine is then reduced so that the temperature does not rise above 120 to 140° C. After the exothermic reaction has subsided, the reaction mixture is subjected to fractional distillation and the bis-chloromethyl carbamic acid chloride is obtained with a boiling point of 85–89° C./12 mm. Hg.

Example 9

1075 parts by weight are first chlorinated as in Example 2 to the bis-chloromethyl carbamic acid chloride stage. The temperature is then raised to 190 to 200° C. and further chlorination takes place under reflux until the internal temperature in the flask has fallen to 175° C. due to the strong reflux. A distilling off of the chloromethyl carbamic acid chloride is completely avoided by use of reflux. The reaction mixture which is obtained is subjected to fractional distillation.

The trichloromethyl isocyanide dichloride is obtained at 55 to 57° C./120 mm. Hg in a yield of 532 parts by weight, $n_D^{20}$ 1.5219. Practically all the remainder of the reaction mixture distils over at 110 to 112° C./17 mm. Hg and constitutes the bis-(dichloromethyl)-carbamic acid chloride, $n_D^{20}$ 1.5225.

This product can again be converted with chlorination into the trimethyl isocyanide dichloride at a temperature above 185° C. In this way, a total yield of 92% of the theoretical of trichloromethyl isocyanide dichloride is obtained.

Example 10

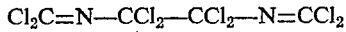

116 parts by weight tetramethyl-ethylene-diamine are dissolved in 1000 parts by volume of 1,2,4-trichloro benzene. A weak current of chlorine is then introduced and the strongly exothermic reaction is restrained by cooling so that the temperature remains between 70–80° C. When the exothermic reaction has subsided chlorination is continued while irradating with ultra-violet light, and the temperature rise is controlled in such a way that within one hour a rise of 10–15° C. takes place. Subsequently chlorination is continued for a further 3 hours at 200–230° C., then nitrogen is blown through and the solution left to cool. On cooling, most of the tetra-chloroethane-bis-isocyanide dichloride precipitates as crystals, the remainder being obtained by further evaporating the solution. Melting point (toluene) 166° C. (white flakes).

Analysis ($C_4Cl_8N_2$)—Found: C, 13.56%; N, 7.90%; Cl, 79.05%. Calculated: C, 13.3%; N, 7.8%; Cl, 79.0%.

Determination of molecular weight (after period in hexachloro-benzene)—Found: 365. Calculated: 360.

We claim:
1. A compound of the formula

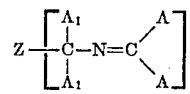

in which each A stands for a member selected from the group consisting of chlorine and

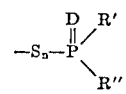

each $A_1$ stands for a member selected from the group consisting of chlorine, hydrogen and

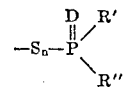

and Z stands for a member selected from the group consisting of

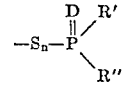

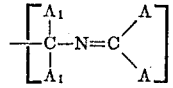

and chloroalkyl containing from 1 to 4 carbon atoms; wherein D is a chalcogen having at atomic number below 17, $n$ is an integer from 0 to 1, and R' and R" stands for alkoxy containing from 1 to 4 carbon atoms.

2. A compound of the formula

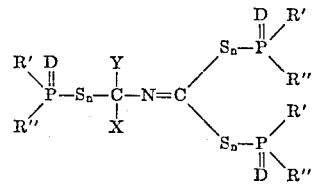

wherein X and Y are each a member selected from the group consisting of a hydrogen atom and

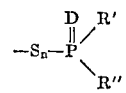

R' and R" are each alkoxy containing 1 to 4 carbon atoms, $n$ is an integer from 0 to 1, and D is a chalcogen having an atomic number below 17.

3. A compound of the formula

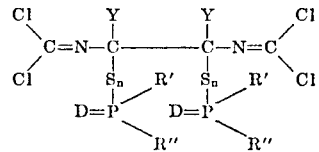

wherein each Y is a member selected from the group consisting of hydrogen and

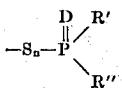

$n$ is an integer from 0 to 1 and D is a chalcogen having an atomic number below 17.

4. A compound of the formula

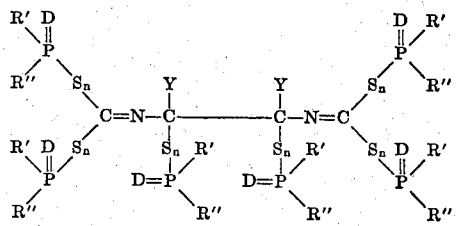

wherein each Y is a member selected from the group consisting of hydrogen and

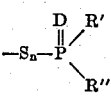

R' and R'' are each alkoxy containing from 1 to 4 carbon atoms, $n$ is an integer from 0 to 1 and D is a chalcogen having an atomic number below 17.

5. 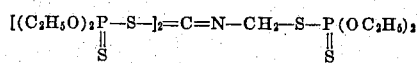

6. 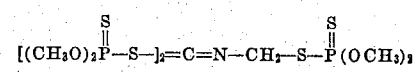

7. 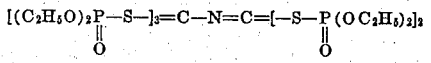

8. 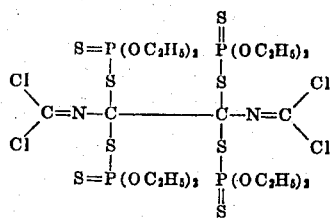

9. 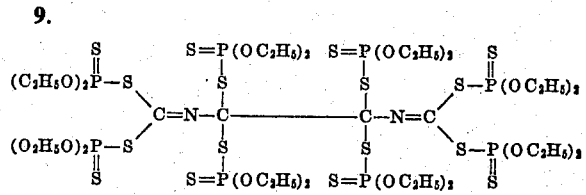

10. 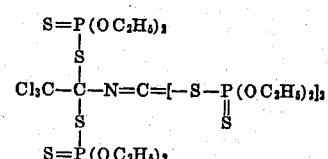

11. 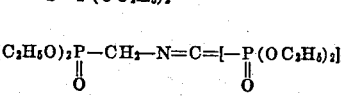

References Cited by the Examiner

UNITED STATES PATENTS

| | | | |
|---|---|---|---|
| 3,053,729 | 9/62 | Sun | 167—22 |
| 3,053,876 | 9/62 | Malz et al. | 260—461 |
| 3,059,017 | 10/62 | Dever et al. | 260—461 |
| 3,060,080 | 10/62 | Lorenz et al. | 167—22 |

CHARLES B. PARKER, *Primary Examiner.*

IRVING MARCUS, *Examiner.*